(12) United States Patent
Resetco

(10) Patent No.: US 11,441,047 B2
(45) Date of Patent: Sep. 13, 2022

(54) COLOR CHANGING INK JET INK WITH TUNABLE TRANSITION STIMULI

(71) Applicant: Xerox Corporation, Norwalk, CT (US)

(72) Inventor: Cristina Resetco, Toronto (CA)

(73) Assignee: Xerox Corporation, Norwalk, CT (US)

(*) Notice: Subject to any disclaimer, the term of this patent is extended or adjusted under 35 U.S.C. 154(b) by 455 days.

(21) Appl. No.: 16/225,921

(22) Filed: Dec. 19, 2018

(65) Prior Publication Data

US 2020/0199392 A1 Jun. 25, 2020

(51) Int. Cl.
| | | |
|---|---|---|
| *C09D 11/50* | (2014.01) | |
| *C09D 11/32* | (2014.01) | |
| *C08F 38/00* | (2006.01) | |
| *C08F 38/04* | (2006.01) | |

(52) U.S. Cl.
CPC .............. *C09D 11/50* (2013.01); *C08F 38/04* (2013.01); *C09D 11/32* (2013.01)

(58) Field of Classification Search
CPC ........... C09D 11/50; C08F 38/00; C08F 38/02
See application file for complete search history.

(56) References Cited

U.S. PATENT DOCUMENTS

| | | |
|---|---|---|
| 5,508,068 A | 4/1996 | Nakano |
| 6,139,779 A | 10/2000 | Small et al. |
| 8,063,164 B2 | 11/2011 | Hays et al. |
| 8,569,208 B1 | 10/2013 | Ribi |
| 8,807,697 B2 | 8/2014 | Coggan et al. |
| 2014/0127429 A1 | 5/2014 | Jarvis et al. |

FOREIGN PATENT DOCUMENTS

WO WO 2009/141237 A1 11/2009

OTHER PUBLICATIONS

Ishijima et al., Chem 3, 509-521, Sep. 14, 2017.*
Yoon et al., J. Mater. Chem., 2012, 22, 8680-8686.*
Dong-Hoon Park et al., "Inkjet-Printable Amphiphilic Polydiacetylene Precursor for Hydrochromic Imaging on Paper," Advanced Functional Materials 2016, 26, 498-506 (published online Dec. 15, 2015).
Extended European Search Report issued in European Application No. 19217198.1-1102, dated May 6, 2020.
Narae Han et al., "Systemized Organic Functional Group Controls In Polydiacetylenes And Their Effects On Color Changes," Journal of Applied Polymer Science, vol. 134, No. 30, Aug. 10, 2017.
Bora Yoon et al., "Inkjet Printing of Conjugated Polymer Precursors On Paper Substrates For Colorimetric Sensing and Flexible Electrothermochromic Display," Advanced Materials, vol. 23, No. 46, Dec. 8, 2011.

(Continued)

*Primary Examiner* — Vu A Nguyen
(74) *Attorney, Agent, or Firm* — Marylou J. Lavoie, Esq. LLC

(57) ABSTRACT

A composition including a molecule comprising (1) a diacetylene moiety or diacetylene precursor; and (2) an alkyl additive; water; an optional co-solvent; an optional surfactant; an optional stabilizer; wherein the composition has the characteristic of color change after application of a stimulus. A process for preparing the composition. A process for preparing a product by printing the composition.

19 Claims, 2 Drawing Sheets

(56) References Cited

OTHER PUBLICATIONS

Bora Yoon et al., "An Injet-printable Microemulsion System For Colorimetric Polydiacetylene Supramolecules On Paper Substrates," Journal Of Materials Chemistry, vol. 22, No. 17, Jan. 1, 2012.

R. Liffmann et al., "Polydiacetylene Stabilized Gold Nanoparticles—Extraordinary High Stability And Integration Into A Nanoelectrode Device," RSC Advances, vol. 5, No. 125, Jan. 1, 2015.

* cited by examiner

COLOR CHANGING INK JET INK WITH TUNABLE TRANSITION STIMULI

BACKGROUND

Disclosed herein is a composition comprising a molecule comprising (1) a diacetylene moiety or diacetylene precursor; and (2) an alkyl additive; water; an optional co-solvent; an optional surfactant; an optional stabilizer; wherein the ink composition has the characteristic of color change after application of a stimulus.

Further disclosed is a process comprising combining a (1) a diacetylene moiety or diacetylene precursor; and (2) an alkyl additive with water; an optional co-solvent; an optional surfactant; and an optional stabilizer, and optionally inducing polymerization to form a polymer; to provide a composition having the characteristic of color change after application of a stimulus.

Further disclosed is a process comprising providing a composition, wherein the composition comprises a molecule comprising (1) a diacetylene moiety or diacetylene precursor; and (2) an alkyl additive; water; an optional co-solvent; an optional surfactant; and an optional stabilizer; disposing the composition onto a substrate; optionally inducing polymerization of the composition, wherein inducing polymerization is done before or after disposing the composition onto the substrate; applying a stimulus to the composition on the substrate; wherein the composition has the characteristic of color change after application of a stimulus.

Color changing inks can switch color after application of a certain stimulus, such as temperature, pH, moisture, or chemical. The color change provides an indication to the user that exposure to a specific stimulus has occurred, which is useful for many applications including identifying spoilage of products due to temperature or moisture. Different types of products (for example, food, electronics, medicines, medical devices, among others) can advantageously employ or even require customized and tunable color changing inks that match the product requirements and use pattern. Therefore, tunable color changing inks that can be ink jet printed are highly desirable to match a variety of application requirements.

Typical commercial color changing inks are multi-component systems, such as microcapsules, which are not compatible with ink jet printing due to their particle size.

U.S. Pat. No. 6,139,779, which is hereby incorporated by reference herein in its entirety, describes in the Abstract thereof a method of making a solvent based ink formulation which includes a thermochromic pigment, wherein the pigment being formed of microcapsules, includes drying a slurry that contains the pigment to a solids concentration between 70% and 99%, mixing the dried slurry in an appropriate mixing base, and adding and desired ink components to the base formulation. Each microcapsule contains a reversible thermochromic coloring material which exhibits a visible change in color between a first color state and a second color state in response to a change in temperature. Acceptable ink components include a gel vehicle, a free flow vehicle, a drying agent, a lithographic varnish, an ink wax, a polyester vehicle, a polyglycol solvent, a colloidal dispersion resin, water, and a defoamer.

Another type of color changing ink is composed of heterocyclic chromophores or liquid crystals. See, for example, WO2009141237A1, which is hereby incorporated by reference herein in its entirety. WO2009141237A1 describes time temperature indicator systems comprising indolenin based spiropyrans containing an N-acetylamido or N-acetylester side chain.

U.S. Pat. No. 5,508,068, which is hereby incorporated by reference herein in its entirety, describes in the Abstract thereof film, fiber and coating ink manufactured by using liquid crystals comprising a combination of (a) at least one compound of each from Group (I) composed of cholesteryl alkyl carboxylate, cholesteryl alkenyl carboxylate, cholesteryl 3-chloro-propionate and cholesteryl halogen, Group (II) composed of cholesteryl alkyl carbonate and cholesteryl alkenyl carbonate, and Group (III) composed of cholesteryl aromatic alkyl or alkenyl carboxylate, cholesteryl aromatic alkyl or alkenyl carbonate, cholesteryl alicyclic carboxylate and cholesteryl alicyclic dicarboxylate, and no less than six compounds in total; (b) containing 22.0 to 7.5 wt % of compounds selected from Group (I), 12.0 to 75.0% of compounds selected from Group (II), and 7.0 to 35.0 wt % of compounds selected from Group (III); and (c) stabilizing liquid crystal by inhibiting each other's ingredients from crystallizing. A process for coating a printed liquid crystal image with electromagnetic radiation curing resin and forming liquid crystal-protecting film by curing the coating film before defects including pinhole and breakage of film are generated. Also included is a multilayer laminated product of liquid crystal image manufactured by laminating liquid crystal images with different color temperatures to change a visible image with the ambient temperature.

Inks such as those described in WO2009141237A1 and U.S. Pat. No. 5,508,068 can be compatible with ink jet printing. However, these inks typically require complex synthesis and their final properties cannot be easily changed. Therefore, tunable color-changing inks that are compatible with ink jet printing are needed to meet different application requirements and provide the desired customization.

Polydiacetylene color-changing inks are compatible with ink jet printing and have been used for different sensing applications. See Dong-Hoon Park, Woomin Jeong, Min-jeong Seo, Bum Jun Park, and Jong-Man Kim, "Inkjet-Printable Amphiphilic Polydiacetylene Precursor for Hydrochromic Imaging on Paper," Adv. Funct. Mater. 2016, 26, 498-506, which is hereby incorporated by reference herein in its entirety. The properties of polydiacetylene inks are typically tuned by the synthesis of different precursor molecules with different melting points. For example, with 10,12-tricosadiynoic acid having a melting point of 54 to 56° C. or with 10,12-pentacosadiynoic acid having a melting point of 62 to 63° C. Another strategy to tune the properties of polydiacetylenes is synthetic modification of the carboxylic acid head group of the precursor molecules, such as 10,12-pentacosadiynoic acid, to modify when a color change occurs and generate a reversible or irreversible color change. See U.S. Pat. No. 8,569,208, which is hereby incorporated by reference herein in its entirety.

U.S. Pat. No. 8,569,208 describes in the Abstract thereof color change compositions that transition from a first to second color state upon application of an applied stimulus. Also provided are substrates having the compositions on a surface thereof, as well as methods of making and using the compositions.

U.S. Pat. No. 8,063,164, which is hereby incorporated by reference herein in its entirety, describes in the abstract thereof diacetylenic materials for the colorimetric detection of an analyte or exposure to certain environmental factors as well as the polymerization reaction products of the diacetylenic compounds.

While currently available inks are suitable for their intended purposes, a need remains for tunable color changing inks that can be ink jet printed. Further, a need remains for tunable color-changing inks that are compatible with ink jet printing and that can meet different application requirements and provide desired customization. Further, a need remains for improved polydiacetylene inks. Further, a need remains for more simple strategies to tune the properties of polydiacetylene inks without the need for complex synthesis which would enable larger scale, lower cost, and broader application of polydiacetylene based color changing inks for different products.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a composition comprising a molecule comprising (1) a diacetylene moiety or diacetylene precursor; and (2) an alkyl additive; water; an optional co-solvent; an optional surfactant; an optional stabilizer; wherein the composition has the characteristic of color change after application of a stimulus.

Also described is a process comprising combining a (1) a diacetylene moiety or diacetylene precursor; and (2) an alkyl additive with water; an optional co-solvent; an optional surfactant; and an optional stabilizer; and optionally inducing polymerization to form a polymer; to provide a composition having the characteristic of color change after application of a stimulus.

Also described is a process comprising providing a composition, wherein the composition comprises a molecule comprising (1) a diacetylene moiety or diacetylene precursor; and (2) an alkyl additive; water; an optional co-solvent; an optional surfactant; and an optional stabilizer; disposing the composition onto a substrate; optionally inducing polymerization of the composition, wherein inducing polymerization is done before or after disposing the composition onto the substrate; applying a stimulus to the composition on the substrate; wherein the composition has the characteristic of color change after application of a stimulus.

DETAILED DESCRIPTION

Figure 1:
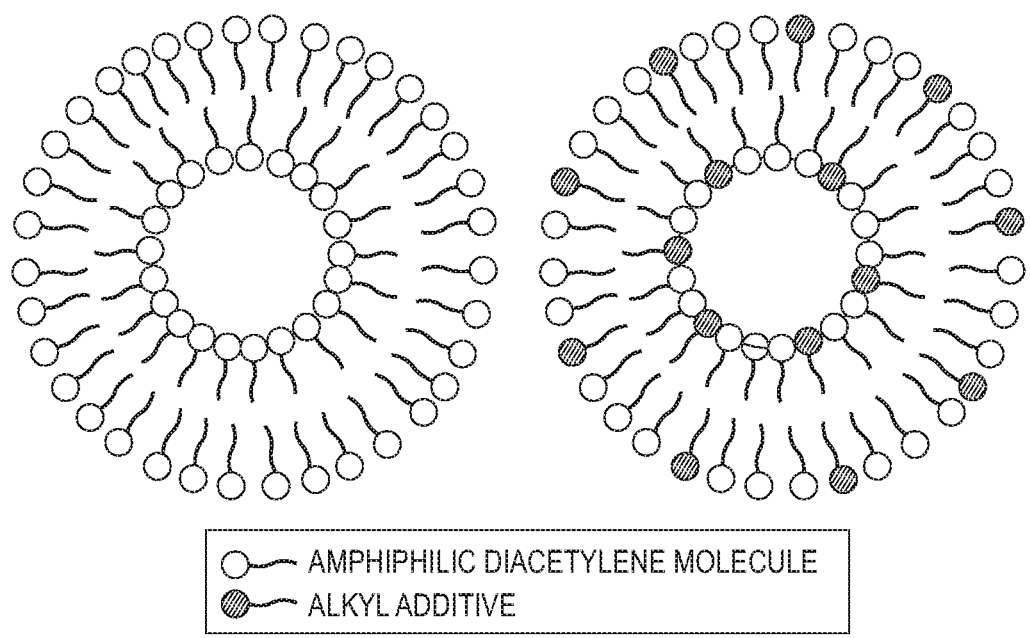
FIG. 1 is a schematic representation of vesicles of amphiphilic diyne molecules in water and mixed vesicles composed of amphiphilic molecules and alkyl additives.

Color changing compositions, in embodiments, color changing inks, with tunable properties and compatibility with ink jet printing architectures are provided. In embodiments, the compositions include polydiacetylene polymers with alkyl additives. In embodiments, the alkyl additives include alkyl alcohols, alkyl amines, alkyl thiols, alkyl polyoxyethylenes, and mixtures thereof. In embodiments, the compositions comprise a polymer comprising (1) a diacetylene moiety; and (2) an alkyl additive; water; an optional co-solvent; an optional surfactant; and an optional stabilizer; wherein the composition has the characteristic of color change after application of a stimulus. In embodiments, the color change is reversible. In other embodiments, the color change is irreversible.

As used herein, a polymer is defined by the monomer(s) from which a polymer is made. Thus, for example, while in a polymer made using a diyne as a monomer, a diyne moiety per se no longer exists because of the polymerization reaction, as used herein, that polymer is said to comprise a diacetylene moiety. Thus, a polymer made by a process disclosed herein can comprise a diacetylene moiety and is called polydiacetylene. The polymer is said to comprise the diyne as the diyne is used with the alkyl additive to make the polymer; thus, the polymer can be said to be composed of or as comprising polydiacetylene and an alkyl additive. Hence, a polymer is defined herein based on one or more of the component monomer reagents, which provides a means to name a polymer of interest and to define and to identify a polymer of interest. In most cases, the alkyl additive is an additive and not a monomer, it does not react. The polymer reaction only involves the diyne molecules that react together while the additive remains embedded in the polymer vesicle. In embodiments, for example such as in the case of alkyl thiol, the thiol does react with the diyne and is part of the polymerization reaction. The term diacetylene moiety used herein can refer to a diacetylene-forming moieity, such as a diacetylene precursor, in embodiments, a diyne.

Thus, in embodiments, the composition comprises a molecule wherein the molecule comprises a polymer resulting from the polymerization of the (1) diacetylene moiety or diacetylene precursor; and wherein the (2) alkyl additive does not polymerize with the diacetylene moiety or diacetylene precursor but rather is embedded in a polymer vesicle resulting from the polymerization of the (1) diacetylene moiety or diacetylene precursor. In other embodiments, the composition comprises a molecule wherein the molecule comprises a polymer resulting from the polymerization of the (1) diacetylene moiety or diacetylene precursor; and the (2) alkyl additive; wherein the (2) alkyl additive does polymerize with the (1) diacetylene moiety or diacetylene precursor such that the molecule is the reaction product of the polymerization of the (1) diacetylene moiety or diacetylene precursor and the (2) alkyl additive.

In embodiments, polydiacetylene polymer vesicles are prepared from 10,12-pentacosadiynoic acid (PCDA) and the alkyl additives are effectively incorporated due to the hydrophilic and hydrophobic interactions with PCDA in an aqueous solution. The alkyl additives modify the transition point of the color change of the composition, in embodiments, the ink, from blue to red. For example, upon heating, the inks with different quantities of additives change color from blue to red at different temperatures, for example, at temperatures of from about 23° C. to about 60° C. Alkyl thiol additives provide additional advantages for the compositions, including better dispersion in aqueous solution and initiation of polymerization of PCDA without the need for ultra violet irradiation, which is useful for large-scale production and sensitive or biological substrates. Thus, in embodiments, the alkyl additive is an alkyl thiol; and wherein the polymerization of the alkyl thiol with the diacetylene moiety or diacetylene precursor does not require UV irradiation.

Color changing inks with tunable stimuli have previously been composed of multiple components that are not compatible with ink jet printing. For different applications, the properties and stimuli of the inks need to be modified in order to match the necessary product requirements.

The present disclosure describes the use of polydiacetylene polymers and alkyl additives to provide ink jet compatible inks having stimuli of the color change. In embodiments, the ink composition has a stimulus point that is tunable by the selection of the alkyl additive. Specific additives, in embodiments, C6 to C12 alkyls with hydroxyl, amine, thiol, and polyoxyethylene head groups, are used to tune the stimuli at which the ink changes color. Stimuli for the color change include temperature, pH, and chemical analytes.

In embodiments, the color change stimulus is tunable by a member of the group consisting of selection of the alkyl additive, selection of the quantity of the alkyl additive relative to the diacetylene moiety or diacetylene precursor, and combinations thereof. For example, a greater amount of additive imparts greater change in response, for example, provides color change at a lower temperature.

In embodiments, the main component of an embodiment of the present ink is a diacetylene-forming molecule, such as 10,12-pentacosadiynoic acid (PCDA) (CAS 66990-32-7), which is a commercially available precursor for polydiacetylene polymers, available from GFS Chemicals®. Other similar starting materials can be selected for embodiments herein, in specific embodiments, molecules containing three key functionalities: (1) hydrophilic head group such as a carboxylic acid, (2) hydrophobic chain, in embodiments, a C10-C25 alkyl, (3) diyne moiety that can be polymerized to form a polydiaceylene polymer. Examples of starting materials include 10,12-pentacosadiynoic acid, 4,6-dodecadiynoic acid, 10,12-docosadiynedioic acid, 5,7-eicosadiynoic acid, 10-12-heneicosadiynoic acid, 10-12-heptacosadiynoic acid, 5,7-octadecadiynoic acid, 6,8-nonadecadiynoic acid, 5,7-tetradecadiynoic acid, 10-12-tricosadiynoic acid, and mixtures thereof.

Thus, in embodiments, an ink composition herein comprises a molecule comprising (1) a hydrophilic head group; (2) a hydrophobic chain; and (3) a diyne moiety; water; an optional co-solvent; an optional surfactant; and an optional stabilizer; wherein the ink composition has the characteristic of color change after application of a stimulus. The hydrophilic head group can be selected from the group consisting of carboxylic acid, ester, amide, and combinations thereof. The hydrophobic chain can comprise an alkyl group, in embodiments, an alkyl group having from about 2 to about 40 carbon atoms, or from about 4 to about 30 carbon atoms, or from about 6 to about 25 carbon atoms. In embodiments, a diyne moiety can be any compound having two acetylene groups.

In embodiments, the ink composition herein comprises a polymer prepared with a diacetylene moiety (or diacetylene-forming moiety or diacetylene precursor) and an alkyl additive. Thus, in embodiments, the composition herein includes a molecule that is a polydiacetylene polymer that is the reaction product of the polymerization of the diacetylene moiety or diacetylene precursor. In embodiments, the diacetylene moiety is selected from the group consisting of 10,12-pentacosadiynoic acid, 4,6-dodecadiynoic acid, 10,12-docosadiynedioic acid, 5,7-eicosadiynoic acid, 10-12-heneicosadiynoic acid, 10-12-heptacosadiynoic acid, 5,7-octadecadiynoic acid, 6,8-nonadecadiynoic acid, 5,7-tetradecadiynoic acid, 10-12-tricosadiynoic acid, and combinations thereof. In certain embodiments, the diacetylene moiety is 10,12-pentacosadiynoic acid.

10,12-pentacosadiynoic acid (PCDA) forms vesicles in aqueous solutions due to the hydrophobic nature of the pentacosadiyne part of the molecule and the hydrophilic nature of the carboxylic acid head group. FIG. 1 illustrates an amphiphilic diyne molecule, such as 10,12-pentacosadiynoic acid in water and mixed vesicles composed of amphiphilic molecules and alkyl additives. The amphiphilic diyne molecule in FIG. 1 can also be considered an amphiphilic diacetylene molecule or precursor. These vesicles polymerize under ultra violet (UV) light (such as about 254 nanometers) by the addition across diacetylene groups. A polymerization of 10,12-pentacosadiynoic acid under UV irradiation (about 254 nanometers) is depicted as follows:

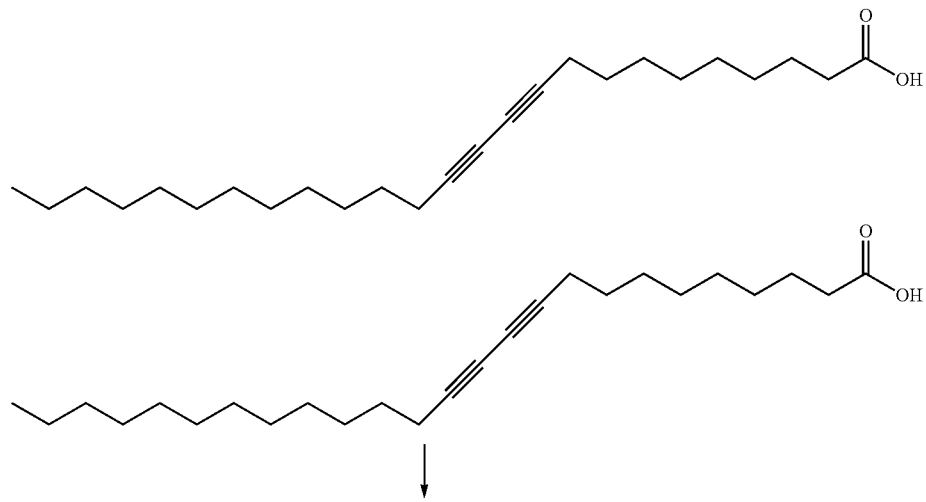

-continued

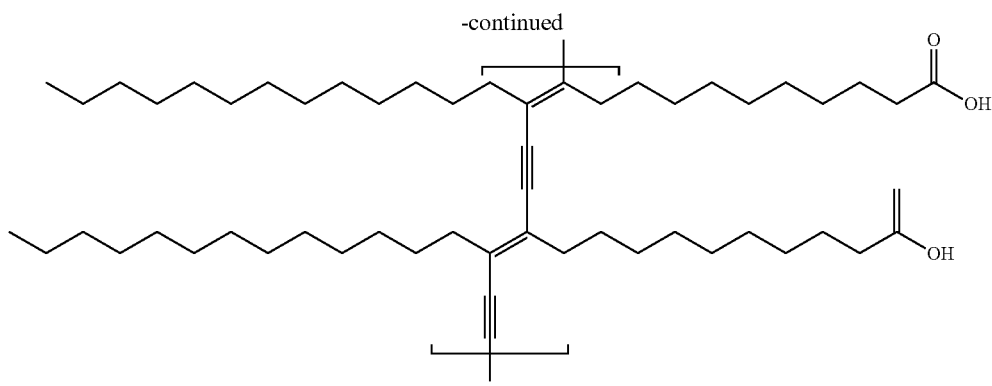

The resulting polymerized PCDA vesicles have a blue color due to the conjugation of unsaturated moieties. After a stimulus is applied, such as temperature, pH, or chemical analyte), the PCDA polymers change color to red due to the alteration of the conjugation. For example, color changing inks herein may exhibit a reversible color change from blue to red or an irreversible color change from blue to red.

The intrinsic properties of the polydiacetylene precursor dictate the colors and stimuli that can induce a color change. The melting point of the starting molecule determines the transition temperature of the color change of the ink. PCDA has a melting point of about 63° C. and typically PCDA-based thermochromic inks change color from blue to red when they are heated to a temperature close to the melting point. However, it is not always feasible or practical to synthesize multiple precursors and test their properties when there are multiple requirements for the ink properties. Therefore, the present disclosure provides use of selected additives to provide a simpler and more cost-effective approach to modify the properties of polydiacetylene inks.

Good compatibility of additives with polydiacetylene precursors and polymers is important in order to preserve the color changing properties and concurrently modify the responsiveness to a target stimulus. Appropriate additives for polydiacetylene color-changing inks desirably meet multiple requirements including: (1) no interference with formation of vesicles, (2) no interference with polymerization of diacetylene groups, (3) no unintended color change due to the presence of additive as opposed to the targeted stimulus.

Common chemical compounds (for example, acids, bases, solvents) can alter the initial color of the polydiacetylene ink, thereby making it permanently red so that the ink no longer changes color after the application of a stimulus. In contrast, the alkyl additives of the present embodiments maintain the initial properties of the PCDA vesicles, for example, initial blue color, PCDA vesicle formation in water, and polymerization. Alkyl additives are particularly useful for PCDA vesicles due to the alignment of the hydrophobic alkyl chains with the hydrophobic chain of the PCDA. For best alignment and compatibility, the alkyl additive is selected to have a hydrophilic head group, in embodiments, hydroxyl, amine, thiol, or polyoxyethylene. In embodiments, the alkyl additive is selected to have one or more hydrophilic head groups selected from the group consisting of hydroxyl, amine, thiol, and polyoxyethylene. The hydrophilic head group is important for compatibility with PCDA hydrophilic carboxylic acid head group and dispersion in water.

Any suitable or desired alkyl additives can be selected for the polydiacetylene compositions herein. In embodiments, the alkyl additives comprise alkyl alcohol additives. The alkyl alcohol additives are compatible with the formation of PCDA vesicles in water and polymerization under UV irradiation. In embodiments, the alkyl alcohol additives comprise a member of the group consisting of hexanol, octanol, decanol, dodecanol, tetradecanol, hexadecanol, octadecanol, and combinations thereof.

The alkyl additives can have any suitable or desired number of carbon atoms. In embodiments, the alkyl additives have from about 2 to about 40 carbon atoms, or from about 2 to about 30 carbon atoms, or from about 4 to about 20 carbon atoms. In embodiments, alkyl additives having from about 4 to about 20 $CH_2$ units are selected for incorporation into polydiacetylene vesicles. In specific embodiments, alkyl additives having from about 6 to about 8 $CH_2$ units are selected. These alkyl additives having from about 6 to about 8 $CH_2$ units do not readily evaporate from the ink formulation and are effectively incorporated into the PCDA vesicles without interfering with UV polymerization. Alkyl additives having a lower number of $CH_2$ units, such as about 4 to about 20 $CH_2$ units, such as less than about 8 $CH_2$ units, or less than about 6 $CH_2$ units, or from about 6 to about 8 $CH_2$ units, have lower melting points and are particularly effective in lowering the overall melting point of the composite polydiacetylene vesicles.

In embodiments, the alkyl additives comprise alkyl amine additives. Alkyl amine additives are highly compatible and effective in the formation of mixed vesicles of PCDA in aqueous solution due to the strong interaction of the carboxylic acid head group of PCDA with the basic amine group and the effective alignment of the alkyl chains of both types of molecules. As a result, the final properties of the PCD vesicles with alkyl amine chains are modified so the stimulus of the color transition is shifted.

In embodiments, the alkyl amine is selected from the group consisting of hexyl amine, octylamine, decylamine, dodecylamine, tetradecylamine, hexadecylamine, octadecylamine, and combinations thereof.

For thermochromic polydiacetylene inks, the transition temperature for the color change is reduced from about 63° C. to about 23° C. In embodiments, PCDA inks herein containing about 40 mol % hexylamine change color at a transition temperature of approximately 36° C. and PCDA inks having about 40 mol % octylamine change color at a transition temperature of about 23° C. Alkyl amine additives can also be selected to modify the pH responsiveness of polydiacetylenes by altering at which pH the color change occurs.

In embodiments, the alkyl additives comprise alkyl thiol additives. Alkyl thiol additives react with the diacetylene moieties in polydiacetylene precursors and thereby initiate polymerization without the need for UV irradiation. The alkyl thiol additive reacts with the diyne and polydiacetylene in a chain reaction that goes through multiple steps of addition and chain transfer between multiple molecules. The reaction of alkyl thiols with polydiacetylenes forms species that polymerize with or without UV irradiation.

In embodiments, the alkyl thiol is selected from the group consisting of hexanethiol, octanethiol, decanethiol, thioglycerol, and combinations thereof.

Figure 2:
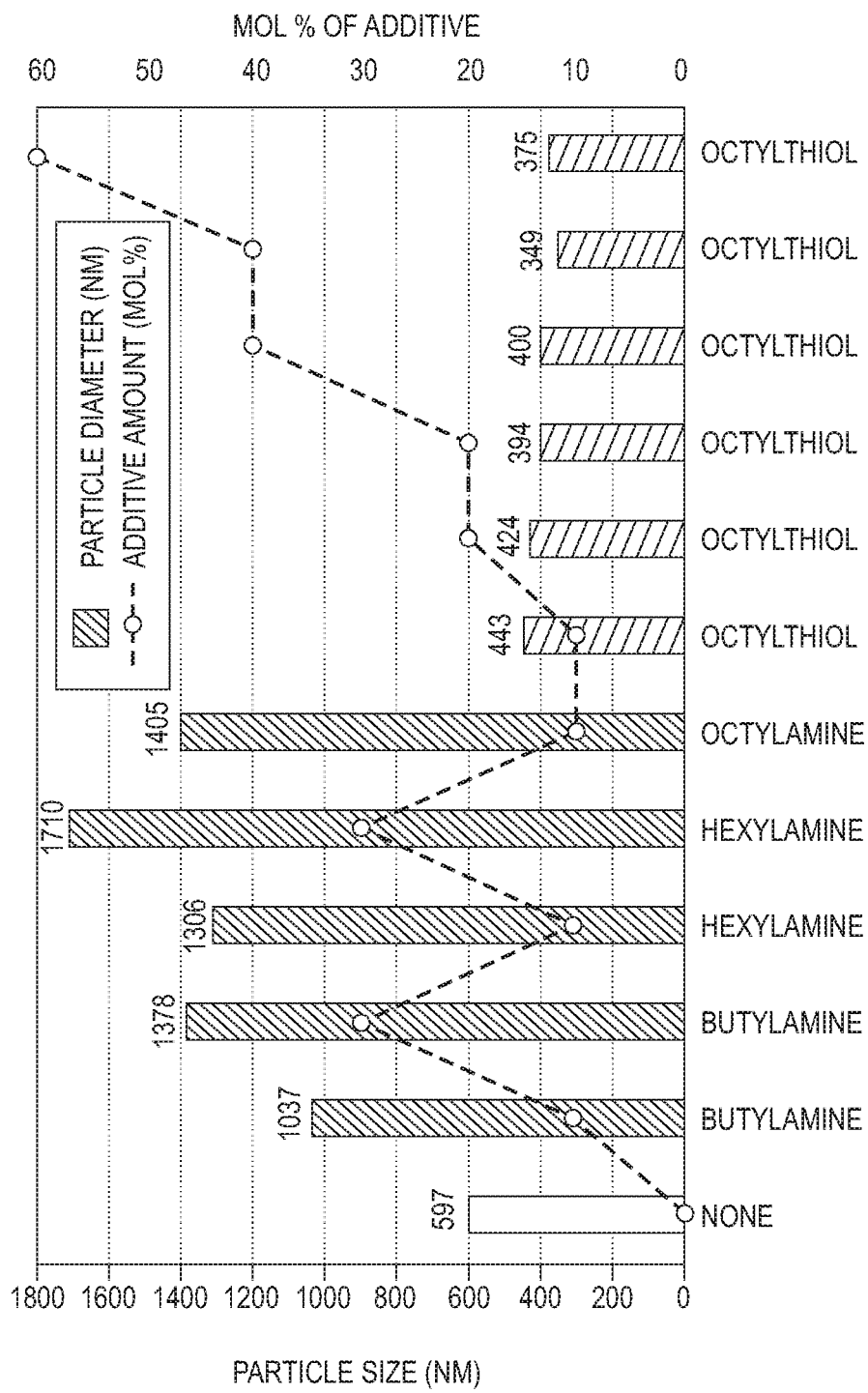
FIG. 2 is a graph illustrating particle size (left y axis, nanometers) versus additive type (x axis) and additive amount (mol %, right y axis).

Color-changing polydiacetylene dispersions with alkyl thiol additives are particularly useful for applications where UV irradiation is unacceptable, such as sensitive substrates and biological samples and tissues. In addition, large scale preparation of polydiacetylenes is more feasible without the need for UV irradiation due to the limited penetration and differences in intensity of UV radiation in large reactor volumes. Further, alkyl thiol additives improve dispersion of polydiacetylenes in water, specifically by maintaining a lower particle size even in the presence of high amounts of additives, for example, about 80 mol % of diacetylene molecule precursor, and reducing the formation of aggregates in dispersions. FIG. 2 provides a comparison of particle size with different additives. The graph of FIG. 2 illustrates particle size (left y axis, nanometers) versus additive type (x axis) and additive amount (mol %) (left y axis).

In embodiments, the alkyl additives comprise alkyl polyoxyethylene additives. Alkyl polyoxyethylene additives are useful for preparing polydiacetylene dispersions in water with high solid contents, in embodiments, greater than about 1 weight percent solids), which can produce higher intensity of color and tunable stimuli.

In embodiments, the alkyl polyoxyethylene is selected from the group consisting of polyoxyethylene oleyl ether, polyoxyethylene cetyl ether, polyoxyethylene lauryl ether, and combinations thereof.

In embodiments, the polyoxyethylene additives include surfactants, in embodiments, polyoxyethylene (20) oleyl ether, polyoxyethylene (20) cetyl ether, and polyoxyethylene (23) lauryl ether. Polyoxyethylene (20) oleyl ether is sold under the tradename Brij™ O20, Polyoxyethylene (20) cetyl ether is sold under the tradename Brij™ 58, and polyoxyethylene (23) lauryl ether is sold under the tradename Brij™ L23, available from Croda.

Thus, in certain embodiments, the present composition comprises an alkyl additive selected from the group consisting of alkyl alcohol, alkyl amine, alkyl thiol, alkyl polyoxyethylene, and mixtures thereof;

wherein the alkyl alcohol is selected from the group consisting of hexanol, octanol, decanol, dodecanol, tetradecanol, hexadecanol, octadecanol, and combinations thereof;

wherein the alkyl amine is selected from the group consisting of hexyl amine, octylamine, decylamine, dodecylamine, tetradecylamine, hexadecylamine, octadecylamine, and combinations thereof;

wherein the alkyl thiol is selected from the group consisting of hexanethiol, octanethiol, decanethiol, thioglycerol, and combinations thereof; and wherein the alkyl polyoxyethylene is selected from the group consisting of polyoxyethylene oleyl ether, polyoxyethylene cetyl ether, polyoxyethylene lauryl ether, and combinations thereof.

The polymer resulting from the polymerization of a diacetylene moiety; and (2) an alkyl additive can be present in the composition, in embodiments the ink composition, in any suitable or desired amount. In embodiments, the "polymer" herein resulting from the polymerization of a diacetylene moiety (or diacetylene precursor or diyne) comprises a polymer comprising the polymerized diacetylene moiety which is interspersed with the alkyl additive. That is, the alkyl additive does not polymerize with the diactylene precursor but rather the polymer reaction only involves the diyne molecules that react together while the additive remains embedded in the polymer vesicle. In other embodiments, for example such as in the case of alkyl thiol, the thiol does react with the diyne and is part of the polymerization reaction and so the resulting polymer is the reaction product of the polymerization of a diacetylene moiety (or diacetylene precursor or diyne) and the reactive alkyl additive, in embodiments, an alkyl thiol.

In embodiments, the polymer comprising (1) a diacetylene moiety; and (2) an alkyl additive is present in the ink composition in an amount of from about 0.001 to about 20 percent by weight, or from about 0.001 to about 10 percent by weight, or from about 0.01 to about 5 percent by weight, based upon the total weight of the ink composition.

The properties of the ink can be tuned or modified by selecting the amount of additive relative to diacetylene moiety. For example, an increase in the amount of additive results in more of a decrease in transition temperature/stimuli. In embodiments, the alkyl additive comprises from about 1 to about 100, or from about 10 to about 50, or from about 20 to about 30 percent of the moles of the diacetylene moiety. In embodiments, the alkyl additive comprises from about 1 to about 100, or from about 10 to about 50, or from about 20 to about 30 percent by weight of the polydiacetylene polymer.

The ink compositions herein can comprise water and an optional co-solvent. The ink solvent can consist solely of water, or can comprise a mixture of water and one or more co-solvents.

The water can be present in any suitable or desired amount. In embodiments, water makes up over 50% of the formulation, in embodiments water comprises from about 50 to about 95% of the ink composition, or from about 60 to about 90% of the ink composition, or from about 60 to about 70% of the ink composition, by weight, based upon the total weight of the ink composition. Thus, the ink compositions herein are mainly aqueous. In embodiments, water comprises about 30% of the ink composition, or about 50% of the ink composition, or about 70% of the ink composition, or about 90% of the ink composition, by weight, based upon the total weight of the ink composition.

The optional co-solvent can be selected from any suitable or desired co-solvent. In embodiments, the co-solvent is selected from the group consisting of ethanol, sulfolane, methyl ethyl ketone, 1-propanol, 2-pyrrolidinone, diethylene glycol, poly(ethylene glycol), ethylene glycol ether, and mixtures thereof.

The optional co-solvent can be present in any suitable or desired amount. The total amount of liquid vehicle including water and optional co-solvent can be provided in any suitable or desired amount. In embodiments, the liquid vehicle is present in the ink composition in an amount of from about 50 to about 95 percent by weight, or from about 60 to about 90 percent by weight, or from about 70 to about 90 percent by weight, based on the total weight of the ink composition.

Alkyl additives can be incorporated into polydiacetylene dispersions with both reversible and irreversible color change properties. In embodiments, dispersions with irreversible color change from blue to red can be prepared directly from diacetylene molecules with a carboxylic acid head group, such as 10,12-pentacosadiynoic acid.

Dispersions with a reversible color change from blue to red can be prepared by adding stabilizers to PCDA. The stabilizing additives include molecules that have strong hydrogen bonding with the carboxylic acid groups of PCDA. Examples of stabilizing additives include heterocyclic aromatic amines and polymers, for example, melamine, poly(vinylpyrrolidone). Another method to form reversible color changing dispersions is to synthetically modify the carboxylic acid head group of a diacetylene molecule with another molecule that has strong hydrogen bonding, such as aminobenzamide.

In embodiments, the optional stabilizer is selected from the group consisting of melamine, poly(vinylpyrrolidone), poly(vinyl alcohol), silicon dioxide, cellulose, and combinations thereof.

The optional stabilizer can be present in any suitable or desired amount. In embodiments, the stabilizer is present in an amount of from about 0 to about 10 percent, or from about 0 to about 5 percent, or from about 0 to about 1 percent, by weight, based upon the total weight of the ink composition.

The properties of color changing dispersions of polydiacetylenes are summarized in Table 1.

TABLE 1

| Additive | Additive Concentration (mole % of PCDA) | Transition Temperature of Color Change (° C.) | Reversible or Irreversible Color Change (Blue to Red) |
| --- | --- | --- | --- |
| None | 0 | 65 | Irreversible |
| Melamine | 300 | 70 | Reversible |
| Hexylamine | 40 | 36 | Irreversible |
| Octylamine | 40 | 23 | Irreversible |
| Octylamine, Melamine | 40, 300 | 40 | Reversible |
| Octanethiol, Melamine | 40, 300 | 40 | Reversible |

Table 2 provides properties (particle diameter and polydispersity index) of polydiacetylene dispersions prepared with 10,12-pentacosadiynoic acid (PCDA) and different additives in aqueous solution. Particle diameter and polydispersity index was measured by dynamic light scattering.

Reversible color change indicates that the material can be subjected to a stimulus multiple times in a cyclical manner and the color changes multiple times. For example, material changes color from blue to red when heated, then red to blue when cooled, and the cycle can be repeated many times. Irreversible color change means that when the material is exposed to stimulus, it changes color and remains that color even when different stimuli are applied later. For example, material is blue, then it is heated, it becomes red and then stays red regardless of temperature or other stimuli.

TABLE 2

| Additive | Additive Amount (mole % of PCDA) | Particle Diameter (Nanometers) | Polydispersity Index |
| --- | --- | --- | --- |
| None | 0 | 597 | 0.21 |
| Butylamine | 10 | 1037 | 0.39 |
| Butylamine | 30 | 1378 | 0.55 |
| Hexylamine | 10 | 1306 | 0.41 |
| Hexylamine | 30 | 1710 | 0.45 |
| Octylamine | 10 | 1405 | 0.32 |

TABLE 2-continued

| Additive | Additive Amount (mole % of PCDA) | Particle Diameter (Nanometers) | Polydispersity Index |
| --- | --- | --- | --- |
| Octanethiol | 10 | 443 | 0.22 |
| Octanethiol | 20 | 424 | 0.20 |
| Octanethiol | 40 | 400 | 0.21 |
| Octanethiol | 60 | 375 | 0.25 |

The compositions herein can be prepared by any suitable process, such as by simple mixing of the ingredients. One process entails mixing all of the ink ingredients together and optionally filtering the mixture to obtain the composition, in embodiments, an ink composition. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes, up to about 24 hours. Alternatively, the optional ink additives can be mixed with the other ink ingredients during the ink preparation process, which takes place according to any desired procedure, such as by mixing all the ingredients, heating if desired, and filtering.

In embodiments, a process herein comprises combining a (1) a diacetylene moiety or diacetylene precursor; and (2) an alkyl additive with water; an optional co-solvent; an optional surfactant; and an optional stabilizer, and optionally inducing polymerization to form a polymer; to provide a composition having the characteristic of color change after application of a stimulus.

Inducing polymerization can entail any suitable or desired treatment. In embodiments, inducing polymerization comprises irradiating the components, such as the (1) a diacetylene moiety or diacetylene precursor; and (2) an alkyl additive, to induce polymerization. In embodiments, inducing polymerization comprises irradiating the components, such as the (1) a diacetylene moiety or diacetylene precursor; and (2) an alkyl additive, in embodiments with ultra violet irradiation. Irradiating can be effected by exposure of the ink image to actinic radiation at any desired or effective wavelength, in one embodiment at least about 10 nanometers to about 480 nanometers, although the wavelength can be outside of these ranges. In embodiments, irradiating comprises UV (ultra violet) irradiation, in embodiments at a wavelength of about 10 to about 400 nanometers.

Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges.

The composition can be polymerized at any suitable or desired point. In embodiments, the composition is polymerized, in embodiments with UV light, in solution or ink form. In other embodiments, the composition is polymerized, such as by treating with UV light, after application, and, in embodiments, drying of the applied composition on the substrate.

The compositions herein can be deposited by any suitable or desired process including manual deposition of the composition, such as by pipetting, or other process. In embodiments, the compositions herein comprises ink compositions which can be employed in any suitable or desired printing process. A process herein comprises providing the present ink composition; depositing the ink composition onto a substrate to form deposited features, an ink image, or a combination thereof. The printing process can comprise a digital printing process including an ink jet printing process, an aerosol printing process, or a pneumatic aerosol printing process. In embodiments, the process further comprises treating, in embodiments, applying a stimulus to the deposited composition on the substrate wherein the ink composition has the characteristic of color change after application of the stimulus. The process can also comprise other methods of treating the deposited features on the substrate including applying a stimulus by any suitable or desired method.

In a specific embodiment, depositing the ink composition comprises depositing using ink jet printing.

The substrate upon which the composition herein is deposited may be any suitable substrate including silicon, glass plate, plastic film, sheet, fabric, or paper. For structurally flexible devices, plastic substrates such as polyester, polycarbonate, polyimide sheets, and the like, may be used. In embodiments, the substrate is a polyethylene naphthalate substrate. The thickness of the substrate can be any suitable thickness such as about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

Any further suitable substrate, recording sheet, or removable support, stage, platform, and the like, can be employed for depositing the ink compositions herein, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, glass, glass plate, inorganic substrates such as metals and wood, as well as meltable or dissolvable substrates, such as waxes or salts, in the case of removable supports for free standing objects, and the like. In embodiments, the substrate is selected from the group consisting of transparency materials, fabrics, textile products, plastics, polymeric films, glass, glass plate, metal, wood, wax, salt, folded paperboard, Kraft paper, and combinations thereof. transparency materials, fabrics, textile products, plastics, polymeric films, glass, glass plate, inorganic substrates such as metals and wood, as well as meltable or dissolvable substrates, such as waxes or salts, in the case of removable supports for free standing objects, and the like.

In certain embodiments, the compositions herein are deposited onto any suitable or desired substrate to form any suitable or desired product. In embodiments, the product formed with the compositions herein can comprise a member of the group consisting of food packaging, food labels, electronic devices, electronic packaging, electronic labels, medical devices, medical labels, test strips, sensors, labels, and the like, and combinations thereof.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

General procedure for the preparation of polydiacetylene dispersions in water. 10,12-pentacosadiynoic acid and alkyl additives were dissolved in ethanol at 70° C. The resulting solution was dropwise added to water or melamine in water solution under vigorous stirring at 70° C. The solution was sonicated for 60 minutes at 70° C. and then cooled slowly and stored at 4° C. for 12 hours. The solution was irradiated with UV, 254 nanometers, under vigorous stirring. Further additives (surfactants, co-solvents) were added for the ink jet ink formulation. The aqueous dispersions and inks having the compositions shown below were prepared using this general procedure.

Example 1

Polydiacetylene dispersion that can change color from blue to red at 70° C. with a reversible color change upon heating/cooling after application and drying on a substrate (for example, paper).

TABLE 3

| Component | Weight % |
| --- | --- |
| 10,12-pentacosadiynoic acid | 0.01 |
| Melamine | 0.09 |
| Ethanol | 7.40 |
| Water | 92.50 |
| Total | 100 |

Example 2

Polydiacetylene dispersion that can change color from blue to red at 40° C. with a reversible color change upon heating/cooling after application and drying on a substrate (for example, paper).

TABLE 4

| Component | Weight % |
| --- | --- |
| 10,12-pentacosadiynoic acid | 0.01 |
| Octylamine | 0.001 |
| Melamine | 0.09 |
| Ethanol | 7.35 |
| Water | 91.89 |
| Total | 100 |

Example 3

Polydiacetylene dispersion that can change color from blue to red at 23° C. with an irreversible color change upon heating/cooling after application and drying on a substrate (for example, paper).

TABLE 5

| Component | Weight % |
| --- | --- |
| 10,12-pentacosadiynoic acid | 0.01 |
| Octylamine | 0.001 |
| Ethanol | 7.36 |
| Water | 91.97 |

TABLE 5-continued

| Component | Weight % |
|---|---|
| Total | 100 |

Example 4

Polydiacetylene dispersion that does not require UV polymerization to form blue dispersion that can change color to red upon heating.

TABLE 6

| Component | Weight % |
|---|---|
| 10,12-pentacosadiynoic acid | 0.02 |
| Octanethiol | 0.01 |
| Melamine | 0.17 |
| Ethanol | 16.63 |
| Water | 83.17 |
| Total | 100 |

Example 5

Ink jet ink composed of a polydiacetylene dispersion that changes color irreversibly from blue to red at 30° C.

TABLE 7

| Component | Weight % |
|---|---|
| 10,12-pentacosadiynoic acid | 0.56 |
| Brij™ O20 | 0.23 |
| Octanethiol | 0.28 |
| Melamine | 0.04 |
| Ethanol | 14.09 |
| Water | 56.38 |
| 1,5-Pentanediol | 10.06 |
| Diethylene Glycol | 7.54 |
| Glycerol | 7.05 |
| Silsurf® A008 | 0.21 |
| Chemguard S-761P | 0.01 |
| Surfynol® 104H | 0.43 |
| 2-ethyl-1-hexanol | 2.11 |
| Propylene Glycol (Mw = 10,000) | 0.42 |
| Total | 100 |

Silsurf® A008 is a very low molecular weight ethoxylated polydimethylsiloxane available from Siltech Corporation.

Brij™O20 is a polyoxyethylene vegetable-based fatty ether derived from cetyl alcohol available from Croda Corporation.

Chemguard S-761P is a short-chain perfluoro-based anionic fluorosurfactant of the phosphate ester type available from Chemguard Corporation.

Surfynol® 104H is a nonionic surfactant available from Evonik Corporation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A composition comprising:
a molecule comprising (1) a diacetylene moiety or diacetylene precursor; and (2) an alkyl additive;
wherein the molecule comprises a polymer resulting from the polymerization of the (1) diacetylene moiety or diacetylene precursor; and the (2) alkyl additive;
wherein the (2) alkyl additive polymerizes with the (1) diacetylene moiety or diacetylene precursor such that the molecule is the reaction product of the polymerization of the (1) diacetylene moiety or diacetylene precursor and the (2) alkyl additive;
water;
an optional co-solvent;
an optional surfactant;
an optional stabilizer;
wherein the composition is an aqueous ink composition having the characteristic of color change after application of a stimulus.

2. The composition of claim 1, wherein the diacetylene moiety or diacetylene precursor is selected from the group consisting of 10,12-pentacosadiynoic acid, 4,6-dodecadiynoic acid, 10,12-docosadiynedioic acid, 5,7-eicosadiynoic acid, 10-12-heneicosadiynoic acid, 10-12-heptacosadiynoic acid, 5,7-octadecadiynoic acid, 6,8-nonadecadiynoic acid, 5,7-tetradecadiynoic acid, 10-12-tricosadiynoic acid, and combinations thereof.

3. The composition of claim 1, wherein the alkyl additive is selected from the group consisting of alkyl alcohols, alkyl amines, alkyl thiols, alkyl polyoxyethylenes, and mixtures thereof.

4. The composition of claim 1, wherein the alkyl additive is an alkyl thiol.

5. The composition of claim 1, wherein the alkyl additive is an alkyl additive having from about 4 to about 20 $CH_2$ units.

6. The composition of claim 1, wherein the alkyl additive is selected from the group consisting of alkyl alcohol, alkyl amine, alkyl thiol, alkyl polyoxyethylene, and mixtures thereof;
wherein the alkyl alcohol is selected from the group consisting of hexanol, octanol, decanol, dodecanol, tetradecanol, hexadecanol, octadecanol, and combinations thereof;
wherein the alkyl amine is selected from the group consisting of hexylamine, octylamine, decylamine, dodecylamine, tetradecylamine, hexadecylamine, octadecylamine, and combinations thereof;
wherein the alkyl thiol is selected from the group consisting of hexanethiol, octanethiol, decanethiol, thioglycerol, and combinations thereof; and
wherein the alkyl polyoxyethylene is selected from the group consisting of polyoxyethylene oleyl ether, polyoxyethylene cetyl ether, polyoxyethylene lauryl ether, and combinations thereof.

7. The composition of claim 1, wherein the optional co-solvent is present; and wherein the optional co-solvent is selected from the group consisting of ethanol, sulfolane, methyl ethyl ketone, 1-propanol, 2-pyrrolidinone, diethylene glycol, poly(ethylene glycol), ethylene glycol ether, and mixtures thereof.

8. The composition of claim 1, wherein the optional stabilizer is present; and wherein the optional stabilizer is selected from the group consisting of melamine, poly(vinylpyrrolidone), poly(vinyl alcohol), silicon dioxide, cellulose, and combinations thereof.

9. The composition of claim 1, wherein the color change is reversible; or wherein the color change is irreversible.

10. The composition of claim 1, wherein the color change stimulus is selected from the group consisting of temperature, pH, and chemical analytes.

11. The composition of claim 1, wherein the ink composition has a tunable stimulus point by selection of the alkyl additive.

12. A process comprising:

combining a (1) a diacetylene moiety or diacetylene precursor; and (2) an alkyl additive with water; an optional co-solvent; an optional surfactant; and an optional stabilizer; and optionally inducing polymerization to form a polymer;

wherein the polymer comprises a polymer resulting from the polymerization of the (1) diacetylene moiety or diacetylene precursor; and the (2) alkyl additive;

to provide an aqueous ink composition having the characteristic of color change after application of a stimulus.

13. The process of claim 12, wherein the color change stimulus is tunable by a member of the group consisting of selection of the alkyl additive, quantity of the alkyl additive relative to the diacetylene moiety or diacetylene precursor, and combinations thereof.

14. A process comprising:

providing a composition, wherein the composition comprises a molecule comprising (1) a diacetylene moiety or diacetylene precursor; and (2) an alkyl additive; water; an optional co-solvent; an optional surfactant; and an optional stabilizer;

wherein the molecule comprises a polymer resulting from the polymerization of the (1) diacetylene moiety or diacetylene precursor; and the (2) alkyl additive;

wherein the (2) alkyl additive polymerizes with the (1) diacetylene moiety or diacetylene precursor such that the molecule is the reaction product of the polymerization of the (1) diacetylene moiety or diacetylene precursor and the (2) alkyl additive;

disposing the composition onto a substrate; and applying a stimulus to the composition on the substrate;

wherein the composition is an aqueous ink composition having the characteristic of color change after application of a stimulus.

15. The process of claim 14, wherein disposing the composition comprises ink jet printing the composition.

16. The process of claim 14, wherein the substrate is selected from the group consisting of transparency materials, fabrics, textile products, plastics, polymeric films, glass, glass plate, metal, wood, wax, salt, folded paperboard, Kraft paper, and combinations thereof.

17. The process of claim 14, wherein disposing the composition onto the substrate results in forming a product comprising a member of the group consisting of food packaging, food labels, electronic devices, electronic packaging, electronic labels, medical devices, medical labels, test strips, sensors, labels, and the like, and combinations thereof.

18. The process of claim 12, wherein the alkyl additive is an alkyl thiol.

19. The process of claim 14, wherein the alkyl additive is an alkyl thiol.

* * * * *